US005195652A

United States Patent [19]

Hooghiemstra, deceased et al.

[11] Patent Number: 5,195,652

[45] Date of Patent: Mar. 23, 1993

[54] APPARATUS FOR REGULARLY DELIVERING BALL-SHAPED OBJECTS

[75] Inventors: George A. Hooghiemstra, deceased, late of Baarnseweg, Netherlands; by Jessica Hooghiemstra; legal representative

[73] Assignee: Jedaho B.V., Bilthoven, Netherlands

[21] Appl. No.: 669,861

[22] Filed: Mar. 15, 1991

[30] Foreign Application Priority Data

Mar. 16, 1990 [NL] Netherlands ........................ 9000607

[51] Int. Cl.[5] ........................................ B65G 29/00

[52] U.S. Cl. ................................ 221/203; 221/277; 198/534

[58] Field of Search ............... 221/200, 203, 277, 162, 221/168; 273/26 D, 29 A, 201; 124/51.1; 198/455, 534

[56] References Cited

U.S. PATENT DOCUMENTS

| | | | |
|---|---|---|---|
| 2,433,619 | 12/1947 | Monroe | 221/200 |
| 2,634,022 | 4/1953 | Wyatt | 221/200 |
| 3,244,319 | 4/1966 | Fessman . | |
| 3,248,008 | 4/1966 | Meierjohan | 221/277 |
| 3,294,402 | 12/1966 | Scott | 221/203 |
| 3,610,223 | 10/1971 | Green . | |
| 3,912,122 | 10/1975 | Knapp | 221/162 |

FOREIGN PATENT DOCUMENTS

| | | |
|---|---|---|
| 3040232 | 4/1981 | Fed. Rep. of Germany . |
| 1457641 | 11/1966 | France . |
| 2568134 | 1/1986 | France . |

*Primary Examiner*—H. Grant Skaggs
*Attorney, Agent, or Firm*—Young & Thompson

[57] ABSTRACT

Apparatus for regularly delivering essentially ball-shaped objects from a quantity, provided with a container for a supply of objects, a discharge channel for the objects to be delivered, and a body rotating about a horizontal axis between the container and the channel and above the channel for regulating the passage of the objects through the channel. The channel has a V-shaped cross-section, and the rotating body has two conical end parts of which the tips facing away from each other coincide with the horizontal axis of rotation. These end parts face the channel walls in such a way that between the bottom of the channel and the rotating body a free passage exists for objects in single file.

5 Claims, 2 Drawing Sheets

APPARATUS FOR REGULARLY DELIVERING BALL-SHAPED OBJECTS

The invention relates to apparatus for delivering ball-shaped objects from a quantity, in which the objects move under the influence of gravity to a delivery point situated low down and are removed there from the quantity.

As an example we mention here the delivery of objects such as golf balls, tennis balls etc. For the development of a correct striking technique a large number of balls must be struck, and these balls are then preferably delivered by a device of the above-mentioned type. It goes without saying that a large number of such objects are concerned here, so that sufficient objects can always be delivered irrespective of the length of the practice. On the other hand, the supply must take place in a regular manner, without a number of balls sometimes appearing simultaneously, and then great intervals occurring between successive objects.

In the known apparatus problems do, however, occur, due to the fact that in the case of a large number of ball-shaped objects in a container, so called bridge formation can occur. This means that when the passage of the container to the discharge opening becomes smaller the different objects can reach such a position relative to each other that they form a stopper which prevents any passage for the objects lying behind them. In particular, if a large number of objects are present in the container, this stopper is pressed strongly by the weight of the objects on top, as a result of which is it not simple to start the device again.

The object of the invention is therefore to provide an apparatus of the above-mentioned type which does not have this disadvantage. This is achieved in that some of the objects near the delivery point are removed from the quantity in a direction essentially crosswise to the discharge direction, in such a way that bridge formation in the quantity before and near that delivery point is avoided.

Since then in the case of the apparatus according to the invention some of the objects are always removed from the vicinity of the delivery point, additional free space is produced there, as a result of which bridge formation is either prevented from occurring or a bridge already produced is destroyed. The removal of certain objects in this way considerably facilitates the flow of the other objects through the delivery point, so that no further stagnation can occur.

The objects removed from the quantity crosswise to the discharge direction are preferably fed in again at a place lying a distance away from the delivery point. In this way each object can still be discharged in the desired way through the delivery point, although some objects remain longer in the quantity than others, through the fact that they are fed back in again.

More particularly, the invention relates to an apparatus for regularly delivering essentially ball-shaped objects from a quantity, provided with a container in which the stock lines, a discharge channel for the objects to be delivered, and regulating means between container and channel for regulating the passage of the objects through the channel. Such known devices are exposed to the risk of bridge formation. The object of the invention is also to provide an apparatus which does not have the disadvantage of bridge formation. This is achieved through the fact that the regulating means have a surface part which can be in contact with the objects in the container and which is movable in at least one direction laterally away from the channel, in such a way that the surface part can produce a movement of the objects laterally away from the channel. The objects carried along by the control means leave behind a space near the passage of the objects through the channel, in such a way that the objects still lying there can now move freely through said passage without a bridge forming in the process.

The regulating means can be designed in different ways. For example, they can be an endless belt which is guided in a suitable manner through the container. According to a preferred embodiment, provision is, however, made for the regulating means to be formed by a body of rotation. The advantage of this design is that such a body of rotation can be exposed to fairly great forces, so that with it a large quantity of objects which can give rise to great pressure near the passage of the objects through the channel, and on said body of rotation, can also be treated.

The axis of rotation of the body of rotation preferably runs horizontally, at right angles to and lying higher up than the channel. Said channel can be designed in various ways. The channel preferably has a V-shaped cross-section, while the body of rotation has two conical end parts of which the tips facing away from each other coincide with the axis of rotation, which end parts face the channel walls in such a way that between the bottom of the channel and the body of rotation a free passage exists for an object in each case. This means that the objects can roll freely under the body of rotation over the bottom of the channel, the rotation of the body of rotation ensuring that near the passage from the channel no bridge formation occurs, since various objects are transported away there by the body of rotation out of the vicinity of the passage.

A cylindrical surface is preferably provided between the bases of the conical end parts, in such a way that a free passage exists between said cylindrical surface and the bottom of the channel.

Good results are obtained with a device in which the bottom of the container is V-shaped in cross-section corresponding to the discharge channel and runs slanting to the discharge channel.

In this embodiment the objects are fed in a very uniform manner to the passage.

The invention will be explained in greater detail below with reference to an example of an embodiment shown in the figures.

Figure 1:
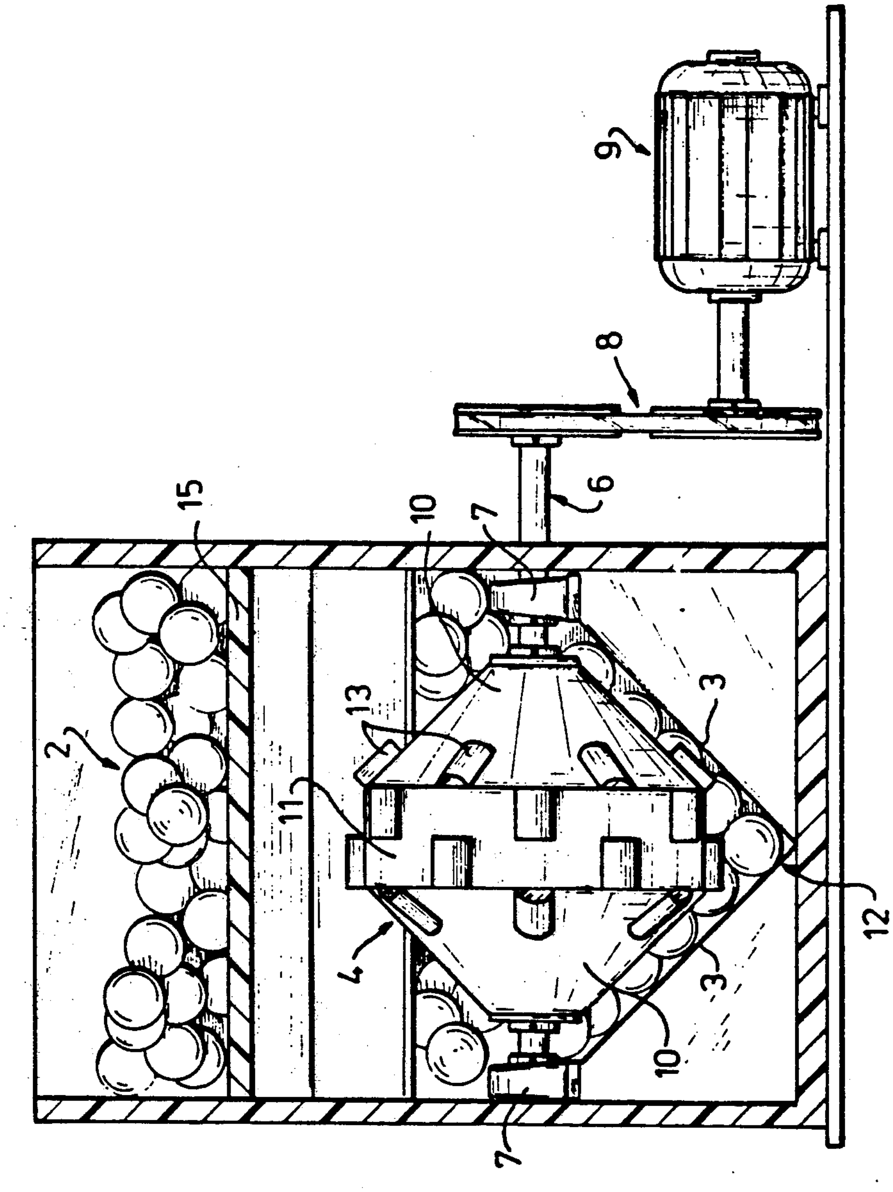
FIG. 1 shows a cross-section of the device according to the invention.

The device for delivering ball-shaped objects comprises a large collection container 1, in which ball-shaped objects such as golf balls or tennis balls 2 are accommodated. The bottom of the container 1 comprises two walls 2 which are combined in a V shape, and between which a body of rotation 4 is placed. As can be seen better in FIG. 2, the walls 3 are inclined downwardly at a small acute angle towards the discharge opening 5, and the body of rotation 4 is placed near the lowest part of the bottom. The body of rotation 4 is fixed on a shaft 6 which is rotatably mounted in bearings 7. The body of rotation 4 can be driven by motor 9 by means of a belt transmission 8.

The body of rotation 4 comprises two conical parts 10, which are interconnected by a cylindrical part 11. The dimensions of the body of rotation 4 are selected in such a way that it fits at a distance into the V-shaped bottom of the container. All this is achieved in such a way that between the lowest part 12 of the bottom and the cylindrical part 11 a free space is left where the ball-shaped objects 2 can roll freely through to the opening 5.

The distance between the conical parts 10 and the walls 3 of the bottom is such that no objects can roll through between them. The body of rotation 4 is also provided with bosses 13 which can exert a driving action on the objects 2 when the body of rotation 4 is being rotated.

Figure 2:
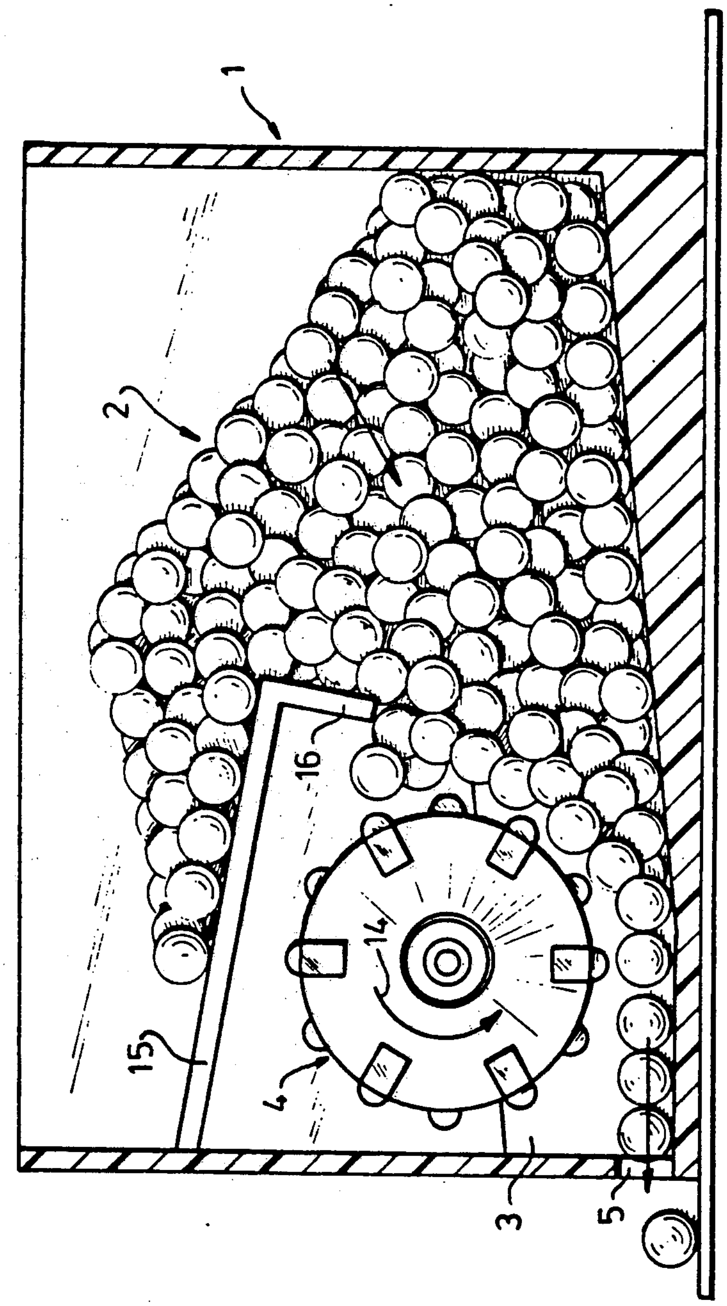
FIG. 2 shows a cross-section of the device according to the invention taken at a right angle to FIG. 1.

As can be seen better in FIG. 2, the body of rotation 4 is rotated in the direction of the arrow 14, in such a way that the objects 2 situated near said body of rotation are moved in a direction away from the V-shaped channel formed by the panels 3. This provides additional space in the quantity of balls situated on the bottom of said channel, in such a way that they can move freely through under the body of rotation 4 without any bridge being formed in the process.

As can also be seen in FIG. 2, the body of rotation 4 is covered by a panel 15. The container 1 can now be filled up completely with objects 2, without the risk of the objects 2 flowing along the wrong side of the body of rotation 4 to the opening 5. The panel 15 is provided with an edge 16, in such a way that the height level of the objects 2 near the body of rotation 4 remains limited.

I claim:

1. In apparatus for regularly delivering essentially ball-shaped objects from a quantity, provided with a container for a supply of said objects, a discharge channel for the objects to be delivered, and a body rotating about a horizontal axis between said container and said channel and above said channel for regulating the passage of the objects through the channel; the improvement wherein the channel has a V-shaped cross-section, and the rotating body has two conical end parts of which the tips facing away from each other coincide with said horizontal axis of rotation, which end parts face the channel walls in such a way that between the bottom of the channel and the rotating body a free passage exists for said objects in single file.

2. Apparatus according to claim 1, in which a cylindrical surface is provided between the bases of the conical end parts, in such a way that said free passage is disposed between said cylindrical surface and the bottom of the channel.

3. Apparatus according to claim 1, in which the bottom of the container is V-shaped in cross-section corresponding to the discharge channel and slant downward to the discharge channel.

4. Apparatus according to claim 1, in which the rotating body is situated at the lowest part of the bottom of the container and is covered at the top side.

5. Apparatus according to claim 1, in which the rotating body is provided with bosses distributed at regular intervals over its periphery, in such a way that a free passage exists between the V-shaped bottom and a boss facing said bottom.

* * * * *